(12) United States Patent
Yu

(10) Patent No.: US 10,922,340 B1
(45) Date of Patent: Feb. 16, 2021

(54) CONTENT EXTRACTION FOR LITERARY WORK RECOMMENDATION

(71) Applicant: Amazon Technologies, Inc., Seattle, WA (US)

(72) Inventor: Jennifer Hui Yu, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 324 days.

(21) Appl. No.: 16/113,941

(22) Filed: Aug. 27, 2018

(51) Int. Cl.
*G06F 40/00* (2020.01)
*G06F 16/31* (2019.01)
*G06N 20/00* (2019.01)
*G06F 16/38* (2019.01)
*G06F 16/335* (2019.01)
*G06F 16/34* (2019.01)
*G06F 40/279* (2020.01)
*G06F 40/30* (2020.01)
*G06F 40/211* (2020.01)

(52) U.S. Cl.
CPC .......... *G06F 16/313* (2019.01); *G06F 16/335* (2019.01); *G06F 16/345* (2019.01); *G06F 16/38* (2019.01); *G06F 40/279* (2020.01); *G06F 40/30* (2020.01); *G06N 20/00* (2019.01); *G06F 40/211* (2020.01)

(58) Field of Classification Search
CPC combination set(s) only.
See application file for complete search history.

(56) References Cited

PUBLICATIONS

No 1449 forms nor any references have been submitted by the Applicants.*

* cited by examiner

*Primary Examiner* — Vu B Hang
(74) *Attorney, Agent, or Firm* — Lee & Hayes, P.C.

(57) ABSTRACT

A method including analyzing a review of a literary work, content of a literary work, or a summary of the literary work to determine keywords describing the literary work. A request for a literary work recommendation and keywords indicating criteria corresponding to the literary work recommendation are received from a user. A similarity is determined between the keywords in the request and the keywords describing the literary work. A literary work is selected as a recommended literary work based at least in part on the similarity.

20 Claims, 9 Drawing Sheets

CONTENT EXTRACTION FOR LITERARY WORK RECOMMENDATION

BACKGROUND

Users are often in search of books to read. For instance, users may search for books using a title of the book, an author's name, or book genre. Books may also be located through recommendations provided by social networks (e.g., friend, family, colleague, etc.) or utilizing a user history that indicates books the user has read, user preferences, or other biographical data. Through analyzing this data, book recommendations may be provided. While existing recommendations aid users, the recommendations and experience may be enhanced.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
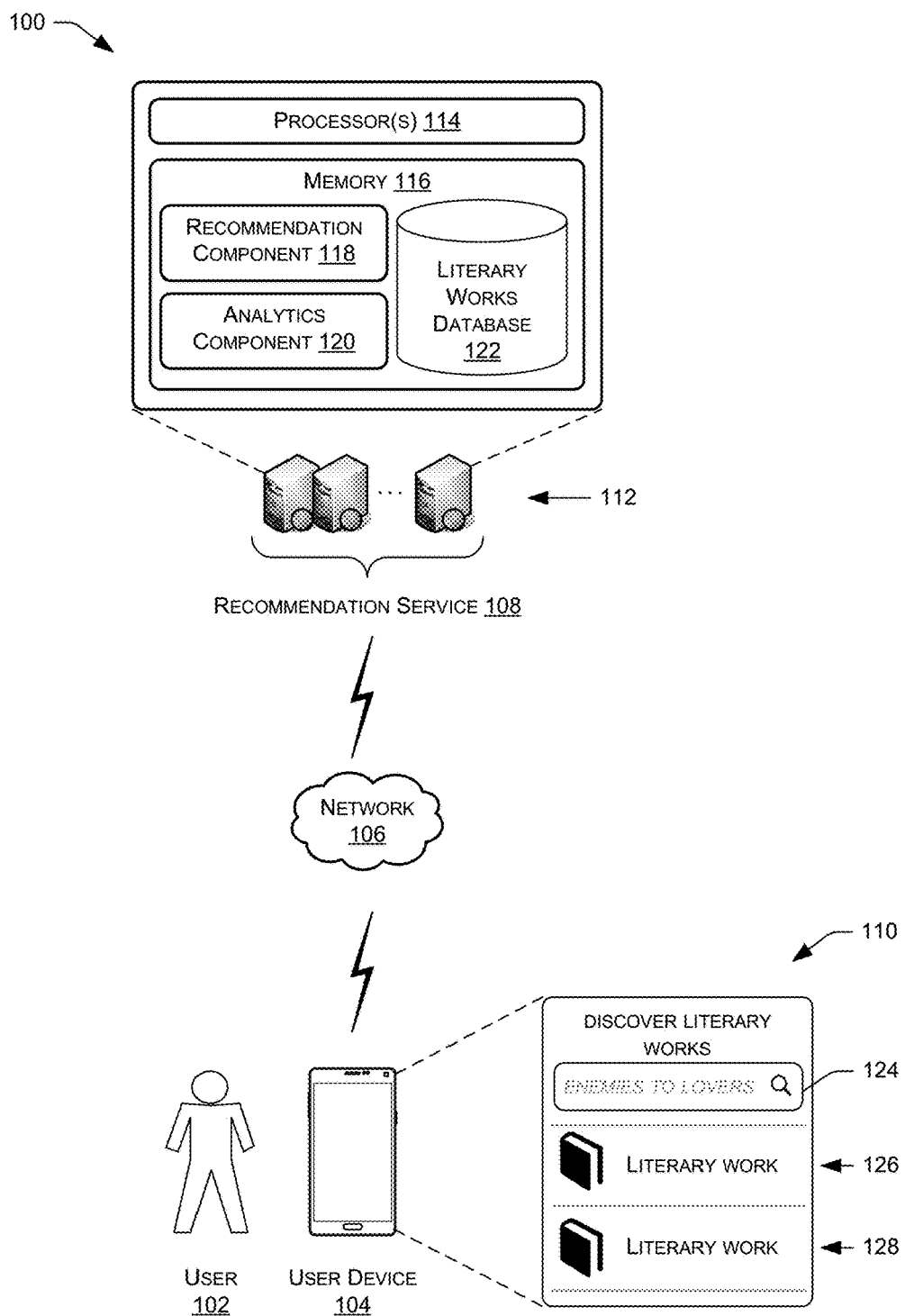
FIG. 1 illustrates an example environment for providing literary work recommendations. In this example, a user may interact with a user device to request one or more literary work recommendations from a recommendation service.

As discussed above, users may search for books or be provided recommended book(s) for reading. These recommendations may be based on a reading history of the user, user preferences, purchase histories, and so forth. For instance, the reading history may indicate that the user often reads science-fiction books. As such, a list of science-fiction books may be recommended to the user. However, using the reading history of the user risks limiting a breadth of books recommended to the user. Additionally, searching by a genre, such as comedy, may require that the user to narrow down a list of comedy books before making a selection. Existing book recommendations also assume that the user understands or knows the contents of the book. For instance, the user may enter the title or author of the book into a search query to locate a particular book. However, the user may know little about the actual contents of the book (e.g., setting, story, mood, plot, etc.). Even after being provided with a recommended book, a user may spend additional time reading summaries of the book before making a selection, making sure that the user actually desires to read the recommended book.

In light of the above, this disclosure describes, in part, techniques for identifying or recommending literary works (e.g., books) that correspond to user request. The user request may include search criteria (e.g., terms and phrases) entered by the user and that define characteristics of a literary work that the user desires. In some instances, the search criteria may include descriptors of a plot (e.g., suspense), a setting (e.g., Hawaii), an author (e.g., Steven King), a story arc, and/or other defining keywords (e.g., cliffhanger, action-packed, drama, etc.). This search criteria entered by the user may then be used to search a database of literary works to recommend one or more literary works(s). For instance, in searching the database of literary works, literary works corresponding to the search criteria may be identified and provided to the user. The techniques herein may therefore generate literary work recommendations that are personalized to the user request.

As used herein, the term "story arc" may refer to a storyline of the literary work and/or how characters, entities, subjects, or topics of the literary work develop, unfold, and move in time. Story arcs may be determined through analyzing content (e.g., text) of a literary work and determining patterns associated with the characters, subjects, and/or topics. These patterns may be characterized or categorized to associate literary works with one another. For instance, key attributes or characteristics of the literary work may be indexed, such as the characters (e.g., age, occupation, etc.), setting(s), topics, and so forth, as well as their actions with each other throughout the literary. Machine-learning algorithms may then use the indexed information to associate characters with certain events, for instance, in determining the story arc of a literary work. Story arcs may also be determined through analyzing a review of the literary work, summaries of the literary work (e.g., back cover of a book), and so forth. By way of non-limiting examples, story arcs may include, or be defined by, rags to riches (e.g., the rise of a character), riches to rags (e.g., the fall of a character), cinderella (e.g., rise of a character, followed by fall of the character, and then followed by rise of the character), from bad to worse (e.g., character continuously falls throughout the story), boy meets girl (e.g., character discovers love, loses love, and then regains love), and so forth. As such, literary works may be defined by one of the aforementioned story arcs (or other examples) to characterize the literary work within the database of literary works.

A user may begin by requesting a literary recommendation and entering search criteria corresponding to a literary work he or she desires to read. The user may input a wide variety of search terms or search criteria into a request, such as freely typing a string of text describing the literary work. For instance, the request may include "I'm looking for an unresolved true-crime book that involves white-collar crime" or "Please find me an enemies to lovers novel set in the nineteen-hundreds." Within this request, words or phrases may be identified as keyword(s) or important characteristics that describe or relate to a type of literary work the user desires to read. For instance, the techniques described herein may parse the request to identify keyword(s) using natural language processing (NLP), machine-learning algorithms, and natural language understanding (NLU) techniques. Here, terms such as "unresolved true-crime" and "white-collar crime" may be identified as keywords that describe important characteristics of a desired literary work the user would like to read.

In some instances, the identified keyword(s) may be mapped or associated with a genre, a plot, or a story arc of literary work or other keywords. For instance, the keywords "unresolved true-crime" may be associated with keywords such as "mystery" while the keywords "white-collar crime" may be associated with keywords such as "finance," "non-violent," "business," "high stakes," and so forth. Instead of utilizing the literal search criteria (i.e., "unresolved true-crime"), or in addition to, this phrase may be associated with other commonly utilized keyword(s) to generalize or categorize the search criteria.

Using the identified keyword(s) or other assimilated and/or closely matched keywords, the literary works database may be searched to locate recommended literary work(s). The literary works database may include a digital library storing literary works that are accessible by computing devices. The database of literary works may represent a searchable index that stores metadata in association with each of the literary works. The metadata may represent data generated from understanding characteristics, traits, or other defining features of the individual literary works and may be generated through analyzing content of the literary work. For instance, NLP techniques (e.g., sentiment analysis, keyword extraction, named entity recognition (NER), topic segmentation, relationship extraction, etc.) may analyze words and a frequency of words included in the literary work. Various machine-learning techniques, algorithms, or processes, such as linear regressions, logistic regressions, neural networks, and/or the like, and/or any combination thereof, may be used to generate keyword(s) that are descriptive of a plot, and/or a story arc associated with the literary work, for instance. Accordingly, the embodiments described herein provide techniques that use machine-learning to use information extracted from literary work in order to generate metadata describing the literary work. For instance, the metadata may indicate a plot, a genre, a story arc, and/or keyword(s) describing topics, themes, or subjects of the literary work. Discussed in detail herein, the metadata stored in association with the literary works may be used to locate literary work(s) within the literary works database that correspond to the keyword(s) or other search criteria within the request. That is, through comparing the keyword(s) in the request to metadata stored in association with the literary works, matches may be determined between the keywords and the metadata.

As literary works are added to the database (e.g., new release), the techniques described herein may analyze the literary works and extract information corresponding to the character(s), setting(s), plot, story arc, as well as relationships between characters, for instance. Noted above, the information may be extracted using a variety of NLP techniques, such as techniques that may be used to identify plot keyword(s). In some instances, as new literary works are added to the literary works database, computing systems that perform the machine-learning techniques may be notified and commence analyzing the literary work and generate metadata. The database may be configured to generate and store a metadata for any number of literary works.

Additionally, or alternatively, the metadata may be generated through analyzing summaries of the literary work (e.g., the back cover of a book), reviews of the literary work (e.g., highest-rated or verified), other databases that include identifiers, descriptors, or tags of the literary work (e.g., Library of Congress, Goodreads, literary work libraries, etc.), or other data sources that describe or include content relating to the literary work (e.g., blogs, social media sites, such as Facebook®, etc.). For instance, the analysis may involve parsing the summary of the literary work using NLP to determine a plot, setting, or other defining characteristics of the literary work (e.g., suspense, lovers to enemies, etc.). Keywords or other identifiers may be extracted from the literary work and used to generate metadata that describes the literary work. For instance, and by way of illustration, the back cover of a book may be analyzed to determine that the book is set on Mars, the plot relates to an astronaut's fight for survival, and the story arc concerns the main character enduring challenges, escaping, and/or overcoming the challenges. Using this analysis, the book may be characterized and metadata may be generated and stored in association with the book in the literary works database.

In another example, reviews (or feedback) of the literary work may be used to generate the metadata. The reviews may be created by readers of the literary work, forums, or other groups that provide information on the literary work and indicate the quality of the literary work, a rating of the literary work, the genre of the literary work, the setting of the literary work, the plot of the literary work, and/or the story arc of the literary work. These reviews may similarly be parsed and analyzed to identify key characteristics, which are then stored in association with the literary work. As reviews, summaries, or other descriptions of the literary work are generated or received, the metadata stored in association with the literary work may be updated.

After searching the literary works database using the search criteria and/or keyword(s), literary work(s) may be recommended to the user. That is, using the search criteria and the keyword(s) contained in the request (or like keywords determined by computing systems), literary works that closely match the request may be flagged as possible recommended literary works. In some instances, determining recommended literary works may involve a comparison between keyword(s) of the request and keywords (or other identifiers) represented by the metadata stored in association with the individual literary works. In some instances, the closest match may be flagged as a recommended literary work. Additionally, or alternatively, several literary works that closely match the search criteria of the request may be provided to the user as recommendations in a ranked or unranked order. The recommendation(s) may also employ the use of scores or similarity values (e.g., numbers, integers, characters, symbols, etc.) between the keyword(s) and the metadata when determining recommendations. The scores and/or similarity values may be utilized to filter literary works that fall below a threshold value. The literary works may be further parsed and filtered before being provided to the user as recommended literary works.

After identifying the recommended literary work(s), an indication of the literary work(s) may be transmitted to the user. For example, an image of the literary work, a link to purchase or view the literary work, an auditory and/or visual description of the literary work, and/or any combination thereof may be provided. In some instances, the recommended literary work(s) may be provided to a user device (e.g., tablet, mobile phone, laptop, computer, etc.).

As a result of the aforementioned techniques, users may spend less time reading reviews of literary works and/or scrolling through recommended literary works before settling on a selection. Instead, users may be provided personalized literary work recommendations that are specific to the search criteria entered by the user and through comparing metadata stored in association with the literary works. In some instances, this may allow real-time comparisons of search criteria with the metadata to provide a prompt recommendation to the user. Moreover, newly added literary works may be quickly analyzed and metadata associated with the literary works may be generated and stored in the literary works database. Computing system may identify trends, patterns, and characteristics of the newly added literary works and generate metadata that describes the literary works. In doing so, newly added literary works may be quickly added to the literary works database to allow the literary works to be searched and possibly recommended to the user.

The analysis by the computing systems (e.g., literary works database) may also identify and/or determine trends in the literary works not apparent or identifiable to humans. For instance, the computing systems may determine plot lines having a plot that is cognitively sophisticated or otherwise hard to understand. Here, a human may be unable to determine or decipher key attributes, trends, or characteristics of the literary work. Even with a list of literary works, a human may not be able to identify the common traits within those literary works that a user desires. For example, the human may not recognize certain traits within the literary works, may focus on one set of traits while ignoring other, possibly more important traits, and/or the like. By generating the metadata of literary works using machine-learning techniques or algorithms, the computing system may identify specific trends that address scaling issues, remove human bias, and/or identify non-obvious relationships.

Still, in generating metadata for literary works and reusing the metadata to generate rankings or recommendations for a plurality of users, the computing system may reduce the processing overhead associated with analyzing the information extracted from the literary works. Generating this metadata and storing it for later use may also reduce the real-time latency when providing literary work recommendations. Thus, the computing system may improve the user experience by providing faster recommendations and reducing computational resources. Moreover, through routinely updating the metadata based on reviews, for instance, the literary work recommendations may potentially become more accurate and relevant to user requests overtime.

While the above discussion relates to recommending literary works, such as books, the concepts and techniques discussed herein may be applicable across other content recommendations. For instance, the techniques described herein may be applicable to visual works (e.g., television shows, movies, etc.), audio works (e.g., songs, podcasts, etc.), other printed media (e.g., newspaper articles, magazine articles, etc.), and/or the like. As an example, lyrics from a song may be analyzed using NLP techniques and categorized using metadata. The bass, treble, or beat of songs may also be analyzed to determine characteristics of the song using one or more machine-learning techniques or algorithms. Using these characteristics, songs, for instance, may be recommended to a user based on search criteria (e.g., high bass, strong guide solo, and so forth).

FIG. 1 illustrates an example literary work recommendation environment 100 showing a user 102 interacting with a user device 104 to request a literary work recommendation according to one embodiment of the present disclosure. The user device 104 may communicate via a network 106 with other computing systems, such as the recommendation service 108, to request and/or receive literary work recommendation(s). For instance, FIG. 1 illustrates that the user device 104 may execute a browser application 110 that provides literary work recommendation(s). The recommendation service 108 may maintain an online location, such as a merchant website, an e-commerce site, or other functionality that offers one or more literary works.

The recommendation service 108 may include a computing system, various modules, components, data stores, and the like. The recommendation service 108 may be implemented as one or more servers 112 and may, in some instances, form a portion of a network-accessible computing platform implemented as a computing infrastructure of processors, storage, software, data access, and so forth that is maintained and accessible via a network (e.g. the network 106) such as the Internet. The recommendation service 108 does not require end-user knowledge of the physical location and configuration of the system that delivers the services. Common expressions associated with these one or more servers 112 may include "on-demand computing," "software as a service (SaaS)," "platform computing," "network-accessible platform," "cloud services," "data centers," and so forth.

The one or more servers 112 include a processor(s) 114 and memory 116, which may store or otherwise have access to a recommendation component 118, an analytics component 120, and a literary works database 122. Discussed in detail herein, the recommendation component 118 and/or the analytics component 120, may analyze a user request to determine one or more recommended literary work(s) from the literary works database 122. To determine content, terms, phrases, or keyword(s) included within the user request (e.g., search criteria), the analytics component 120 (or other components) may utilize natural language processing (NLP) techniques. For instance, the analytics component 120 may include NLP techniques (e.g., sentiment analysis, keyword extraction, named entity recognition, topic segmentation, relationship extraction, etc.) that parse input (e.g., words, sentences, etc.) included within a user request.

The analytics component 120 may also analyze content of the literary work(s) stored in the literary works database 122 to understand topics, entities, subjects, setting(s), plot(s), story arc(s), or other characteristics of the literary work(s). For instance, the analytics component 120 may analyze text of a literary work stored in the literary works database 122 to determine a plot. Moreover, information may be extracted from reviews of the literary work or third-party databases storing information associated with the literary work (e.g., Library of Congress). Using the extracted information, the analytics component 120, or another component of the recommendation service 108, may generate metadata or other identifiers to be stored in association with the literary work in the literary works database 122.

To receive a user request the browser application 110 may include an input field 124 where the user 102 inputs a request for a recommended literary work. Within the input field 124 the user 102 may input text descriptive of a literary work the user 102 desires to receive. In this sense, the user 102 may input criteria corresponding to a literary work recommendation within the input field 124. Illustrated in FIG. 1, the user 102 entered "enemies to lovers" in the input field 124, indicating that the user 102 would like to read an "enemies to lovers" literary work. However, the user 102 may enter a plurality of inputs into the input field 124. As examples, the user request may include "I want a fiction novel that takes place in 1880's Hawaii," "I'm looking for an unresolved true-crime book that involves white-collar crime," "Please find me an action book where the main character escapes death and defeats the enemy," or "Find a medieval storybook where the main character starts off in poor health and continually gets worse throughout the book." The user request may also include a more direct request, such as "action book, strong female character, set in Thailand, blessed by fortune." After receiving the input, the user device 104 may transmit the user request to the recommendation service 108. In the aforementioned instances, the analytics component 120 analyzes the user request and determines keyword(s) within the user request.

For instance, the recommendation service 108 may analyze the user request using NLP techniques to determine a meaning or characteristics of the user request. The recommendation service 108 may determine, using the analytics component 120, that the user 102 desires a literary work including an enemies to lovers plot. In some instances, the analytics component 120 may extract keyword(s) from the user request such as "enemies" and "lovers" or determine closely related keyword(s) to the user request (e.g., opponents).

In some instances, the recommendation component 118 may utilize the keyword(s) extracted by the analytics component 120 to search the literary works database 122. In other words, the recommendation component 118 may utilize results of the analytics component 120 (i.e., the metadata) stored in association with the literary work(s), as well as the keyword(s) of the user request, to compare the keyword(s) and the metadata when recommending one or more literary work(s) to the user. Through comparing the keyword(s) with the metadata stored in association with the literary work in the literary works database 122, the recommendation component 118 may determine one or more literary work(s) to recommend to the user 102.

The recommendation service 108 may transmit, to the user device 104 via the network 106, the one or more recommended literary work(s). For instance, FIG. 1 illustrates that the browser application 110 displays a first literary work 126 and a second literary work 128 in response to the user request and after the recommendation service 108 searches the literary works database 122. The first literary work 126 and the second literary work 128 may satisfy the user request such that the first literary work 126 and the second literary work 128 correspond to or include stories about enemies to lovers.

As used herein, a processor, such as the processor(s) 114 may include multiple processors and/or a processor having multiple cores. Further, the processor(s) 114 may comprise one or more cores of different types. For example, the processor(s) 114 may include application processor units, graphic processing units, and so forth. In one implementation, the processor(s) 114 may comprise a microcontroller and/or a microprocessor. The processor(s) 114 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 114 may possess its own local memory, which also may store program components, program data, and/or one or more operating systems.

The memory 116 may include volatile and nonvolatile memory, removable and non-removable media implemented in any method or technology for storage of information, such as computer-readable instructions, data structures, program component, or other data. Such memory 116 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 116 may be implemented as computer-readable storage media ("CRSM"), which may be any available physical media accessible by the processor(s) 114 to execute instructions stored on the memory 116. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 114.

Although FIG. 1 illustrates the user device 104 as a particular device (e.g., phone), the user device 104 may include any computing devices, such as personal computing devices (e.g., tablet, eBook reader, etc.), terminal computing devices, laptop computing devices, mobile devices (e.g., mobile phones, media players, handheld gaming devices, etc.). Moreover, the term "book" and/or "literary work," as used herein, includes electronic or digital representations of printed works, as well as digital content that may include text, multimedia, hypertext, and/or hypermedia. The books and/or literary works may also correspond to hard-copy printed works. Examples of printed and/or digital works include, but are not limited to, books, magazines, newspapers, periodicals, journals, reference materials, textbooks, anthologies, instruction manuals, proceedings of meetings, forms, directories, web pages, plays, screen plays, closed caption transcripts of movies and television shows, song lyrics, and so forth. Accordingly, the terms "book" and/or "eBook" may include any readable or viewable textual content that is in electronic or digital form.

Figure 2:
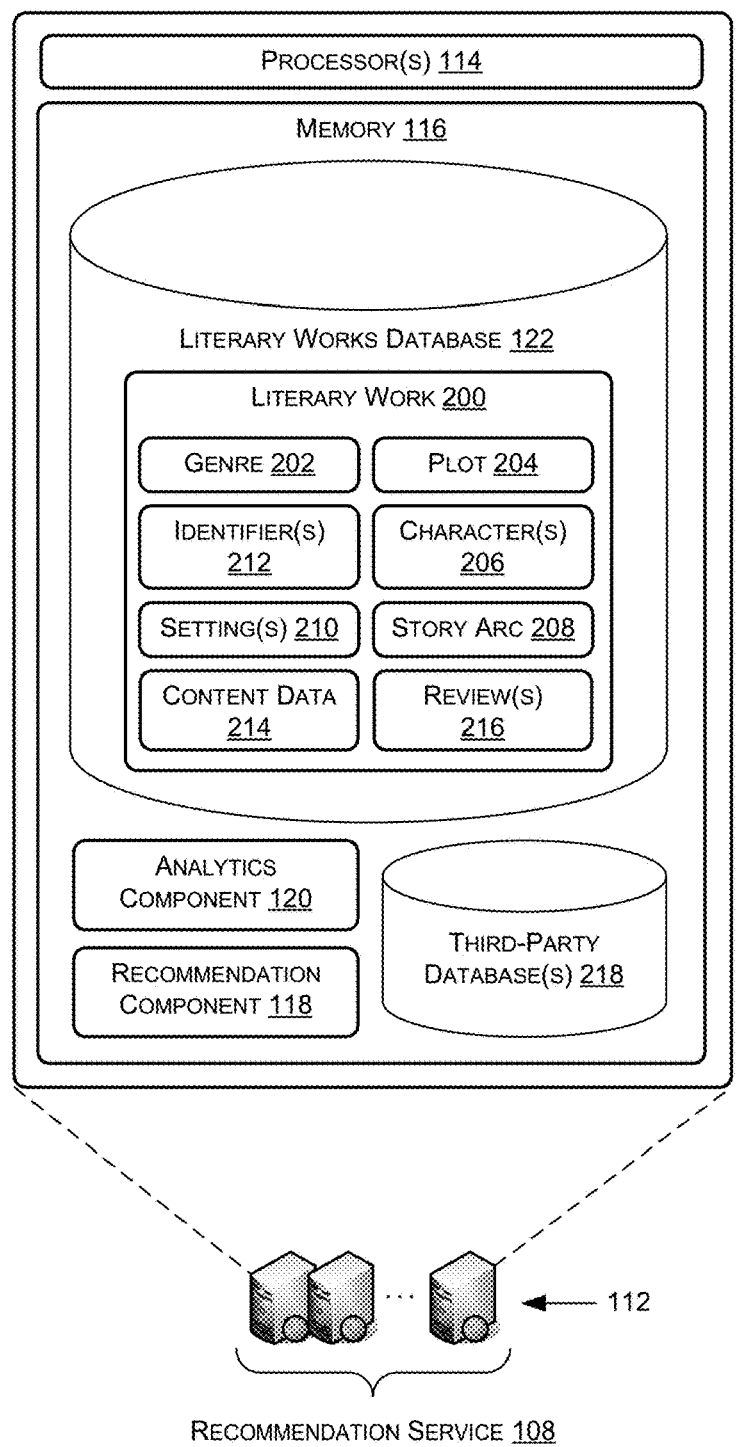
FIG. 2 illustrates a functional block diagram of an example recommendation service.

FIG. 2 illustrates selected functional components of the recommendation service 108 and the one or more servers 112. The one or more servers 112 include the processor(s) 114 and the memory 116. As illustrated, the memory 116 stores or otherwise has access to the literary works database 122. Individual literary works may be stored in the literary works database 122. That is, the literary works database 122 may be a database of literary works that stores any number of literary works. For instance, FIG. 2 illustrates an instance of a literary work 200 stored in the literary works database 122. However, although reference is made to the literary work 200, the literary work 200 may be representative of other literary works stored in the literary works database 122. In some instances, the recommendation service 108 may receive the literary work 200 as from a publisher, author, or other source, and may process the literary work 200 to make the literary work 200 compatible with various display formats, device platforms, and so forth to be stored in the literary works database 122.

The literary works database 122 stores metadata (e.g., information) extracted from the literary work 200 or other content associated with literary work 200. The extracted information may represent keyword(s), topics, entities, important information, characteristics, or other identifiers capable of being searched by components of the recommendation service 108. In this sense, upon being stored in the literary works database 122, the literary work 200 may undergo language identification (e.g., named entity recognition (NER)) to identify text associated with the literary work 200. For instance, using natural language processing (NLP) techniques, information may be extracted from the literary work 200 and used to generate metadata describing the literary work 200. The NLP techniques may also include sentiment analysis to determine a mood (e.g., light-hearted) of the literary work 200. This metadata may be stored in association with the literary work 200 in the literary works database 122.

For instance, the analytics component 120 may analyze content (e.g., text) of the literary work 200 and generate metadata. The analytics component 120 may utilize NLP techniques and/or machine-learning algorithms to extract, locate, identify, or otherwise determine characters within the literary work 200, geographic locations referenced in the literary work 200 (e.g., setting(s)), relationships between characters in the literary work 200, relationships between geographic locations in the literary work 200, a plotline of the literary work 200, a plot structure of the literary work 200, a story arc of the literary work 200, entities of the literary work 200, topics of the literary work 200, and so forth. For instance, certain NLP techniques, such as sentiment analysis, may be used to determine a mood of the literary work 200. The mood may be represented by certain descriptors, such as "light-hearted" or may be represented through numerical, percentage, or character values (e.g., 90% happy and 10% sad).

Determining which information to extract may be based at least in part on identifying keyword(s) within the literary work 200, such as verbs, nouns, and/or adjectives. Additionally, in some instances, determining the extracted information may be based on a frequency of occurrence of particular words and/or a total number of instances of particular words. In some instances, the analytics component 120 may utilize adapters for certain types of content and/or NLP techniques. For instance, the analytics component 120 may use adapters that adapts the NLP techniques to analyze the literal text of the literary work 200, while the analytics component 120 may use alternative adapters that adapt the NLP techniques to analyze reviews or blogs associated with the literary work 200.

Additionally, the analytics component 120 may utilize the extracted information to determine relationships or patterns within the literary work 200. As an example, the analytics component 120 may map important events to characters or places within the literary work 200. For instance, references to character(s) within the literary work 200 may be mapped to actions, entities, setting(s), and so forth in the literary work 200 based on a proximity to a referenced character. Important events, may in some instances, be determined through assigning weights to individual words, such as adjectives, that characterize actions, events, and/or results and then mapping the individual works to actions. Discussed in more detail herein, in some instances, a graph may be generated and analyzed to determine characteristics of a story arc or other characteristics of the literary work 200. Additionally, or alternatively, text surrounding the occurrence of the character(s) may be extracted based on various factors, such as sentence breaks and other punctuation, up to a maximum threshold amount of text permitted. The analytics component 120 may utilize automated techniques for locating and identifying topics (e.g., characters) in the literary work 200, for instance, to perform automatic plot recognition.

Utilizing the extracted information, metadata may be generated and stored in association with the literary work 200. In turn, the metadata may be used by the recommendation service 108 when identifying recommended literary work(s) to the user 102. Generating and storing the metadata may allow for reduced memory requirements and faster processing when recommending literary works. For instance, rather than the recommendation component 118 comparing keyword(s) in the user request to the text of the literary work to identify recommended literary work(s), the metadata stored in association with the literary works allows for a comparison between the keyword(s) in the user request and the metadata that is descriptive of the literary work 200.

To illustrate, FIG. 2 shows that the literary work 200 may be stored in association with metadata indicating, or including, a genre 202 of the literary work 200, a plot 204 of the literary work 200, character(s) 206 of the literary work 200, a story arc 208 of the literary work 200, and/or a setting(s) 210 of the literary work 200. Additionally, the literary work 200 may be stored in association with an identifier(s) 212 of the literary work 200 (e.g., title) and content data 214 of the literary work 200. With the metadata, the literary works database 122 may represent a searchable and/or browsable listings, indexes, and descriptions of the literary works available literary works database 122.

The content data 214 may represent the literal text or other content (e.g., back cover of a book) of the literary work 200. To extract information from the literary work 200, the processor(s) 114 may cause the analytics component 120 to analyze the content data 214 (e.g., text, images, etc.) of the literary work 200. As noted above, in some instances, extracting the information may involve using NLP techniques, keyword recognition (e.g., proper noun, adjective, etc.), and/or named entity recognition (NER) to parse the content of the literary work 200, for instance, to identify names, places, actions, results, organizations, and other objects or other descriptors of the literary work 200. The information may also be identified through determining nouns contained in the literary work 200. The analytics component 120 may, in some instances, attempt to identify topics (e.g., setting(s)) that have relevance to the character(s) of the literary work 200 by determining contributions that subjects may have to one another. For example, extracted information that corresponds to a noun may be used to determine whether any other nouns are discussed in relation to or reference the noun. In some instances, the extracted information may depend on a number of occurrences within the literary work and/or the contributions to the overall plot of the literary work 200.

The extracted information may therefore serve to summarize the content or story of the literary work 200, representing important characteristics, characters, events, or relationships within the literary work 200. In such instances, the extracted information may be utilized to generate keyword(s) or other identifiers that describe or relate to the literary work 200, such as the plot 204, the setting(s) 210, the character(s) 206, and so forth. These keyword(s) may therefore serve to describe the content data 214 of the literary work 200. As examples, the genre 202 may include metadata describing a genre of the literary work 200, such as comedy, action, thriller, drama, and so forth. The genre 202 may also include metadata describing sub-genres categories, such as gothic-comedy. The plot 204 may include metadata describing a plot of the literary work 200, such as "quest," "rebirth," "tragedy," "homeward bound," and so forth. The character(s) 206 may include metadata describing or representing character(s) referenced in the literary work 200, such as genders, names, ages, and so forth. The story arc 208 may include metadata describing a story arc of the literary work 200, such as "rags to riches." The setting(s) 210 may include metadata describing setting(s) of the literary work 200, such as places referenced in the literary work 200 (e.g., forest, cities, etc.). However, the metadata stored in association with the literary work 200 may include other descriptors or keyword(s) than those discussed.

Additionally or alternatively, metadata may also be generated utilizing other sources. For instance, review(s) 216 of the literary work 200, third-party database(s) 218, and/or only certain portion of the literary work 200 (e.g., back cover) may be utilized. The review(s) 216, for instance, may include reviews of the literary work 200 by user(s) or social media groups. The review(s) 216 may relate to a reader's rating of the literary work 200 and/or may include a description of contents or a perception of the literary work 200. Likewise, the third-party database(s) 218 may include information describing the literary work 200. For instance, the third-party database(s) 218 may store or include information about a plot or genre of the literary work 200. As an example, the Library of Congress database may include information about the literary work 200 and a classification of the literary work 200. Here, the analytics component 120 may similarly extract information from the review(s) 216 and/or the third-party database(s) 218 to supplement and/or generate the metadata stored in association with the literary work 200. In some instances, the third-party database(s) 218 may be searched for entries that correspond to the extracted information to provide context of the information extracted. The third-party database(s) 218 may also be utilized to determine character(s), setting(s), plot(s), and so forth of the literary work 200.

The review 216 of the literary work 200 may include "this book relates to a quest of hobbits whom depart on an adventure to reclaim treasure and along their journey, the characters have to fend off dangers." The analytics component 120 may analyze the review 216 to extract keyword(s) describing the literary work 200. This extracted information may be different or similar to the information extracted from the digital content 214, or may characterize the literary work 200 in a different manner. Accordingly, analysis of the review 216 may be utilized to generate and/or update the metadata stored in association with the literary work 200.

In some instances, characterizing the literary work 200 in a different manner may allow for faster searching of the literary works database 122. That is, generating metadata that represents the literal terms of the literary work 200 may risk characterizing the literary work 200 at a level of specificity that includes keyword(s) unlikely to be included in a user request. Rather, more general keyword(s) that describe the literary work 200 may allow the literary work 200 to be more searchable within the literary works database 122.

The analytics component 120 may utilize adapters to tailor or adapt the NLP techniques depending on the source from which information is extracted. That is, as the analytics component 120 utilizes the NLP techniques to extract the information and generate metadata, depending on the source from which the information is extracted (e.g., review, third-party content, etc.), the NLP techniques may be adapted. In this process, the analytics component 120, or another component of the recommendation service 108, may determine the type of content being analyzed (e.g., the content data 214, the review(s) 216, the third-party database(s) 218, etc.) to permit the NLP techniques that are utilized to extract the information to adapt according to the type of content. For instance, in analyzing literal content of the literary work 200, such as the content data 214, the adapters may be used to adapt the NLP techniques such that the NLP techniques include NER and sentiment analysis to identify, for instance, a mood of the literary work 200. In other instances, such as when the analytics component 120 is extracting information from the review(s) 216, the adapters may be used to adapt the NLP techniques to utilize keyword spotting. Here, since the review(s) 216 may be more likely to contain reader input and reader opinions, using NLP techniques that include keyword spotting may more effectively locate information to be extracted, as compared to, for instance, NER and/or sentiment analysis. In other words, the adapters serve to adapt the NLP techniques such that, for instance, when the analytics component 120 analyzes the review(s) 216, the NLP techniques include keyword spotting (e.g., plot, setting, etc.), but may not include sentiment analytics and/or NER. Similarly, adapters may be used to adapt the NLP techniques when the analytics component 120 searches or extracts information for the third-party databases(s) 218. For instance, using the adapters, the NLP techniques may adapt to the data structure of the third-party database(s) 218. As such, the adapters may be utilized to adapt the analytics component 120 and the NLP techniques based at least in part on the source from which the information is extracted.

The recommendation component 118 is configured to utilize the metadata in providing literary work recommendation(s). In receiving a recommendation for a literary work, such as when the user 102 visits a website or an application that provides literary work recommendations, the recommendation service 108 receives a user request identifying characteristics or criteria of a literary work that the user 102 would like to read. The recommendation component 118, or the analytics component 120, may analyze the user request and extract keyword(s) or identifiers corresponding to the user request. In either instance, the user request may be parsed using NLP techniques to determine characteristic(s) of the literary work recommendation. For instance, in receiving a user request that includes "Please recommend a crime book where a young detective attempts to solve a mystery, only to discover that is partner is behind it all," the NLP techniques and/or the machine-learning algorithms may extract keywords such as "crime," "detective," "mystery," and "corrupt," for instance. These keyword(s) may be descriptive of a type of literary work recommendation the user 102 desires. In some instances, the recommendation service 108 may map these keyword(s) to more commonly referenced keyword(s), or other keyword(s) that are descriptive of the literary work(s) stored in the literary works database 122. That is, the recommendation service 108 may utilize literal keyword(s) extracted from the user request or may generate and/or identify other closely assimilated keyword(s) descriptive of the user request. As an example, a user request may include "Please find me a romance book taking place in the Emerald City." The keywords "Emerald City" may be too specific to store in association with the literary work 200 and may not represent a keyword that is searchable and/or browsable within the literary works database 122. However, the keyword "Seattle" may instead be determined to be a synonym of "Emerald City" and may be searchable and/or browsable. Through determining and utilizing keyword(s) closely assimilated with the user request, the recommendation service 108 may perform faster processing when locating recommended work(s). That is, in some instances, instead of searching for the literal terms included in the user request, which may require very specific keyword searching, the analytics component 120 may determine closely matched keyword(s) with which to search the literary works database 122 in order to generalize the request into keyword(s) stored in the literary works database 122.

After the keyword(s) are identified, the recommendation component 118 may utilize the keyword(s) to search the literary works database 122. For instance, the keyword(s) extracted from the user request may be compared to the metadata stored in association with the literary works to determine matches or closely matched literary works. The recommendation component 118 may perform the comparison using machine-learning techniques or algorithms, such as linear regressions, logistic regressions, decision trees, neural networks, and/or the like, and/or any combination thereof. Types of machine-learning algorithms may include supervised learning, unsupervised learning, semi-supervised learning, reinforcement learning, and so forth. If a match exists, the recommendation component 118 may flag the literary work as a potential recommended literary work.

In some instances, scores may be assigned to individual literary works stored in the literary works database 122 based on a similarly between the keyword(s) in the user request and the metadata. The scores may be values that represent a similarity between the user request and the metadata, such as a number (e.g., from 0 to 1.0), set of characters, symbols, etc. In some instances, the recommendation component 118 may rank and/or filter literary works using the score. The ranking or score assigned to the literary works may be based on number of common fields (e.g., plot, setting, etc.) between the keyword(s) of the user request and the metadata stored in association with the literary works. For instance, if the keyword(s) do not match the metadata, the literary work may be assigned a low rating or a low score, which may be filtered or otherwise prevented from being a literary work recommendation. In some instances, the recommendation service 108 may recommend one or more literary works based on the ranking or scores, such as determining the top three-ranked literary works. The recommendation service 108 may also determine reasons why a literary work is recommended and may include an explanation that indicates a recommended literary work has a similar structure or similar plot corresponding to the user request, for instance.

The recommendation component 118 and/or the analytics component 120 may also determine relationships between literary works. For instance, the analytics component 120 may determine that a first literary work is similar to a second literary work through a comparison of the metadata stored in association with each of the first literary work and the second literary work, respectively (e.g., first metadata associated with the first literary work and second metadata associated with the second literary work). During the process of comparing the user request with the metadata of the literary works and in locating the first literary work that corresponds to the user request, the recommendation component 118 may also identify that the second literary work is similar to the first literary work. Therefore, in some instances, instead of searching individual literary works stored in the literary works database 122, the recommendation component 118 may instead locate literary works that are stored in associated with one another to recommend literary work(s). In some instances, these associations between literary works 200 may save or reduce computational resources through only searching portions of the literary works database 122. That is, in locating a first literary work corresponding to the user request, other literary work(s) may be identified based on associations with the first literary work, instead of searching the literary works database 122.

After searching the literary works database 122 and determining literary works that satisfy the user request, the recommendation component 118 may provide recommendations to the user 102 as recommended literary work(s). The recommendation service 108 may provide the recommended literary work(s), and in some instances, the rankings, to the user device 104 that causes the user device 104 to display information about the recommendations. For example, when executed by a browser application running on the user device 104, data transmitted from the recommendation service 108 to the user device 104 may cause the user device 104 to display an identity of the literary works in a user interface. In an embodiment, the recommended literary work(s) include a link or option to review, purchase, or otherwise learn more information about the recommended literary work(s). The recommendation service 108 may further facilitate a download of the literary work in digital form to the user device 104 over the network 106. In other instances, the recommendation service 108 may cause for delivery of a hard copy of the recommended literary work(s) to the user 102.

The recommendation service 108 may be configured to update and continuously generate metadata corresponding to the literary work 200. For instance, as the review(s) 216 of the literary work are generated, or as third-party database(s) 218 are updated and/or generated, the analytics component 120 may receive content associated with the review(s) 216, either automatically or in response to the recommendation service 108 accessing the third-party database(s) 218, for instance, to analyze and extract information and automatically generate metadata. In some instances, the recommendation service 108 may independently seek out and obtain updates to the literary work 200, such as the review(s) 216 from the third-party database(s) 218. The metadata may also be updated when the user selects a literary work recommendation and/or purchases a literary work identified in the literary work recommendation. For instance, in such a scenario, keywords included within the user request may be associated with the literary work 200 and/or stored in association with the literary work 200. That is, the analytics component 120 may store keywords included within the user request in association with the literary work 200. Through this iterative process, new metadata may be generated, replace existing metadata, or supplement any already existing metadata stored in association with the literary work 200. Therefore, the metadata may be updated such that the metadata stored in association with the literary work 200 is iteratively refined to more accurately reflect content or characteristics (e.g., plot) of the literary work 200.

In some instances, the review(s) 216 may be verified prior to extracting information, thereby ensuring that the extracted information is verified, trusted, or reputable. The third-party database(s) 218 may similarly be verified. Additionally, to control the generation of metadata, the recommendation service 108 may apply one or more policies to determine whether the updated metadata differs from previously stored metadata to warrant storing the metadata in association with the literary work 200. For example, if the updated metadata (or the extracted information) differs by a predetermined threshold amount, the recommendation service 108 may cause the updated metadata to be stored in association with the literary work 200. In some instances, whether the updated metadata (or keyword(s)) differs from previously stored metadata by more than a threshold amount may reduce redundant storage of metadata within the literary works database 122.

In generating new metadata, the recommendation service 108 may re-rank or filter a set of existing literary work recommendations. Based on the new scores or ranking, the recommendation service 108 may then reorder existing rankings and/or select a different literary work(s) to recommend to the user 102. The updated literary work recommendation(s), for instance, may be provided on a one-time or periodic basis. That is, if at a first instance the literary works database 122 does not include a literary work corresponding to the user request, but is later updated with one or more literary works, the recommendation service 108 may provide updated recommended literary work(s). In some instances, this process may be performed automatically based on receiving new literary works. For instance, as new literary works are added to the literary works database 122, or as new metadata is generated through the review(s) 216, the recommendation service 108 may search the newly added literary works or the newly updated literary work(s). If a match exists between a previous user request, the literary work(s) may be provided as updated recommended literary work(s).

The recommendation service 108 may operate in parallel and for multiple users at the same time. For instance, recommendations for literary works received from multiple (and possibly unique) user devices 104 may be requested and the components of the recommendation service 108 may generate the recommendations simultaneously or nearly simultaneously in real time for the multiple user devices 104. As such, the recommendation service 108 may be configured to simultaneously process a plurality of user requests and generate literary work recommendations for a plurality of users.

Figure 3:
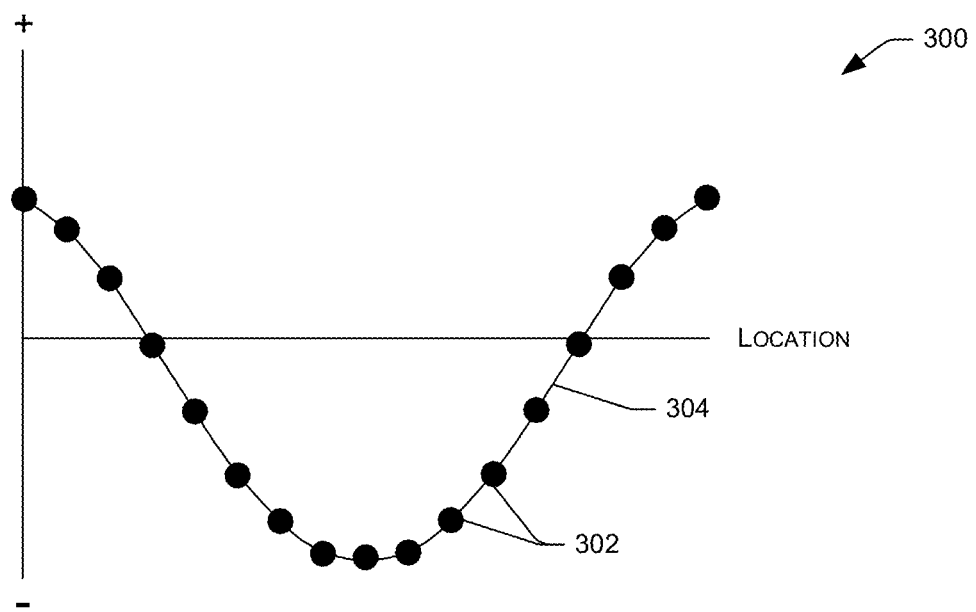
FIG. 3 illustrates an example literary work graph generated from extracting information from a literary work.

FIG. 3 illustrates an example graph 300 associated with a literary work that is generated using NLP techniques. The graph 300 illustrates a plurality of nodes 302, which may represent an event corresponding to a character or an event that affects a character within a literary work 200. Such events may be extracted utilizing NLP techniques or machine-learning algorithms discussed above. For example, the NLP techniques may be configured to determine the events within the literary work 200 by using keywords to search content of the literary work 200. Depending on the event, or the effects of the event, the event may be assigned a value with either a positive, neutral, or negative weight. This value may be shown by the placement of the nodes 302 with respect to the y-axis. For example, the nodes 302 may have a positive value if a relationship is positive (e.g., two characters are friends, a character had a good experience in a geographic location, etc.). Conversely, the nodes 302 may have a negative value if a relationship is negative (e.g., two characters are enemies, two characters fought against each other, a character had a bad experience in a geographic location, etc.).

The x-axis of the graph 300 represents a timeline corresponding to the literary work 200. The far left of the x-axis represents a beginning of the literary work 200 while the far-right of the x-axis represents an end of the literary work 200. The nodes 302 that represent the events within the literary work 200 may be associated with a location in the literary work 200, as shown by the placement of the nodes 302 with respect to the x-axis.

A story arc 304 may be generated by connecting adjacent nodes 302 and through identifying the relationship between the nodes 302. For instance, the graph 300 illustrates that the story arc 304 of the literary work 200 begins positive, transitions to negative, and then returns to positive. In some instances, this story arc 304 may be utilized to characterize the literary work 200. This characterization may reduce human bias or error in describing the literary work 200.

In some instances, the graph 300 may illustrate relationships of characters within the literary work 200 or may relate to a specific character referenced with the literary work 200 (e.g., a main character). For instance, the graph 300 may be generated for character(s) of the literary work 200, and after plotting the nodes 302, the story arc 304 may indicate the relationship between characters referenced in the literary work 200. That is, by connecting the nodes 302 to create the story arc 304, the story arc 304 may represent a positive relationship, a negative relationship, or a neutral relationship between characters of the literary work 200. As the story line of the literary work 200 progresses (e.g., along the x-axis), the graph 300 (and/or the story arc 304) may indicate relationships or interactions between the characters. As such, the graph 300 may be analyzed to determine whether characters have a negative relationship with each other, a positive relationship with each other, or any combination thereof. Additionally, the story arc 304 may represent a particular character's plight throughout the course of the literary work 200. That is, rather than the story arc 304 representing a relationship between two characters, the nodes 302 may correspond to events within the literary work 200 from a particular character's perspective. Here, the values assigned to the nodes 302 with respect to the y-axis represents whether the events associated with the main character are positive, neutral, or negative.

The story arc 304 shown in the graph 300 may be used to describe characteristics of the literary work 200 for the purpose of determining whether either the literary work 200 should be presented as a recommendation. For instance, the analytics component 120 may generate metadata describing the literary work 200 through utilizing the graph 300. In some instances, sub-graphs may be extracted from the graph 300 using a variety of techniques to pinpoint certain time frames within the literary work 200, such as using one or more nodes 302 in the graph 300. Additionally, as reviews (e.g., the reviews 216) of the literary work 200 are provided, and as information is extracted, graph 300 may be modified.

Figure 4A:
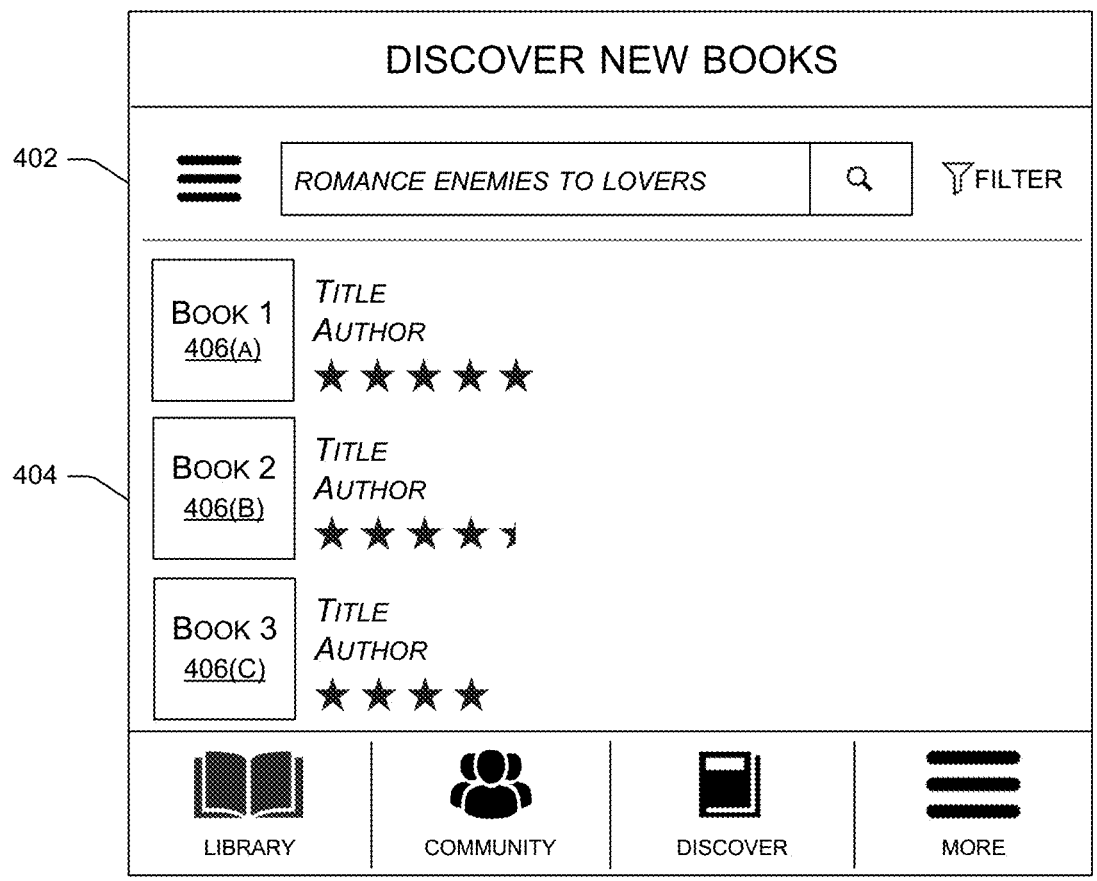
FIG. 4A illustrates a first example of a user interface for displaying literary work recommendations.
Figure 4B:
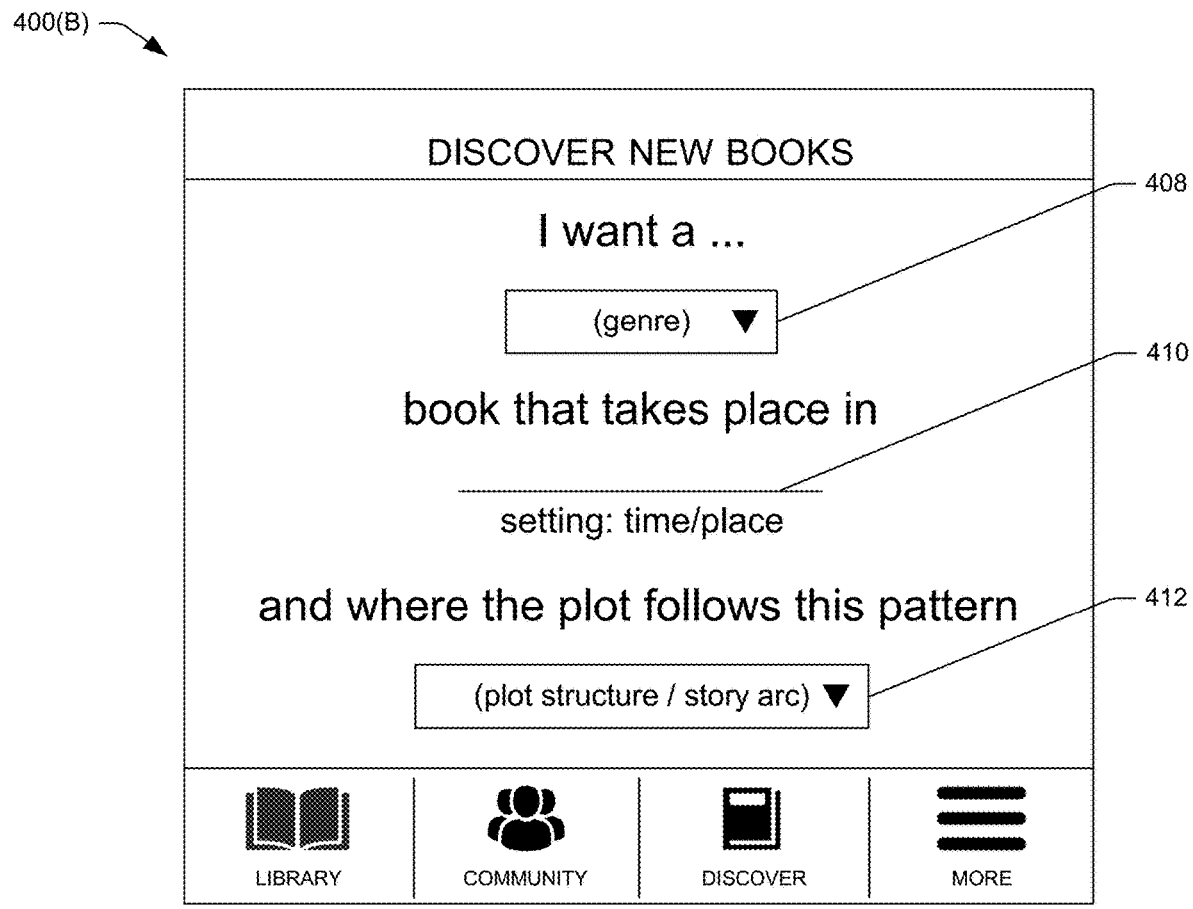
FIG. 4B illustrates a second example of a user interface for displaying literary work recommendations.

FIGS. 4A and 4B illustrate example user interfaces or network pages displayed on a user device, such as the user device 104, when a user requests recommended literary work(s). In either instance, the user interfaces or the network pages may be displayed within a browser application of the user device 104.

As illustrated in FIG. 4A, a user interface 400A includes an input area 402 (which may be similar to and/or represent the input field 124) where a user may insert (e.g., type) characteristics of a literary work the user would like to read. For instance, shown in FIG. 4A, the user has typed "romance enemies to lovers," indicating that the user would like to read a romance literary work where the characters in the book start and enemies and grow to be lovers. However, while FIG. 4A provides an example entry into the input area 402, the user may provide, and the embodiments herein, may be configured to accept a plurality of inputs from the user. In this sense, the input area 402 may function as a free-form input where the user may freely type characteristics of a book recommendation. After inserting characteristics of a desired literary work the user may submit a request.

The user interface 400A may display results within a results area 404 that correspond to the user request entered into the input field 402. For instance, the results area 404 illustrates a first book 406(A), a second book 406(B), and a third book 406(c) being displayed (collectively, "the books 406"). In some instances, each of the books 406 may be displayed along with a picture of the book, a title of the book, an author of the book, or other indicator(s), as well as a rating of the books 406. Additionally, the first book 406(A), the second book 406(B), and the third book 406(C) may be presented with an explanation of why the book is recommended. As an example, such explanation may include "the first book is recommended because this book is a romance where the main characters are enemies at first, but as the story progresses, the characters fall in love."

Discussed above, to recommend the books 406 displayed in the results area 404, the user device may transmit the user request to the recommendation service 108. The user device may perform keyword extraction on the user request, or the recommendation service 108 may perform the keyword extraction. Once the keyword(s) are identified, the recommendation service 108 may access the literary works database 122 and identify literary work(s) corresponding to the user request by comparing the keyword(s) to the metadata stored in association with the literary works. The recommendation service 108 may then determine that the first book 406(A), the second book 406(B), and the third book 406(C) include metadata that matches or closely matches the keyword(s) of the user request. Therein, the recommendation service 108 may transmit an identity of the first book 406(A), the second book 406(B), and the third book 406(C) to the user device for display.

In some instances, the first book 406(A), the second book 406(B), and the third book 406(C) may be ranked and displayed according to the ranking within the results area 404. The recommendation service 108 may rank the first book 406(A), the second book 406(B), and the third book 406(C) (or other books matching the user request) in order of how closely their metadata matches the user request, therein transmitting an indication of the ranking to the user device. For instance, the first book 406(A) may correspond to a most highly ranked book associated with the user request. Additionally, or alternatively, a threshold amount of books may be presented in the results area 404. Further, additional filters may be applied to the results shown in the results area 404. For instance, the filters may filter by author, alphabetic, rating, year of publishing, and so forth.

In some instances, the user interface 400A may include selection criteria where the user may change a selection criteria and only search the literary works within certain categories. For instance, the user interface 400A may only include an option to search for the plot of the literary work, the setting, and so forth.

The user may select one of the books 406, for instance, via touching an area corresponding to one of the first book 406(A), the second book 406(B), or the third book 406(C) respectively. In response, the user interface 400A may cause the contents of the book (e.g., the book 406(A)) to be displayed. Additionally, or alternatively, the contents of the book may be downloaded to a user device (e.g., the user device 104).

FIG. 4B illustrates a user interface 400B where a user may request a book recommendation using drop-down menus and/or input fields. For instance, the user may select a genre of a desired book through a drop-down menu 408. Here, the user may select from a plurality of genres, including action, romance, fiction, science-fiction, comedy, and so forth. In the input field 410, the user may insert a setting, such as a place and time corresponding to a desired book. For instance, the user may type "Hawaii," "Hawaii 1880's," "Ancient Rome," "Outer Space," and so forth into the input field 410. The user may also select a plot structure or story arc of the desired book through a drop-down menu 412, which may include a limited amount of story arc options to select. However, in some instances, instead of the drop-down menu 408 and/or the drop-down menu 412, input fields where the user is permitted to freely type may be presented instead. As such, rather than being provided a limited number of selectable options (e.g., genre), the user may instead describe the book he or she would like to read.

Figure 4C:
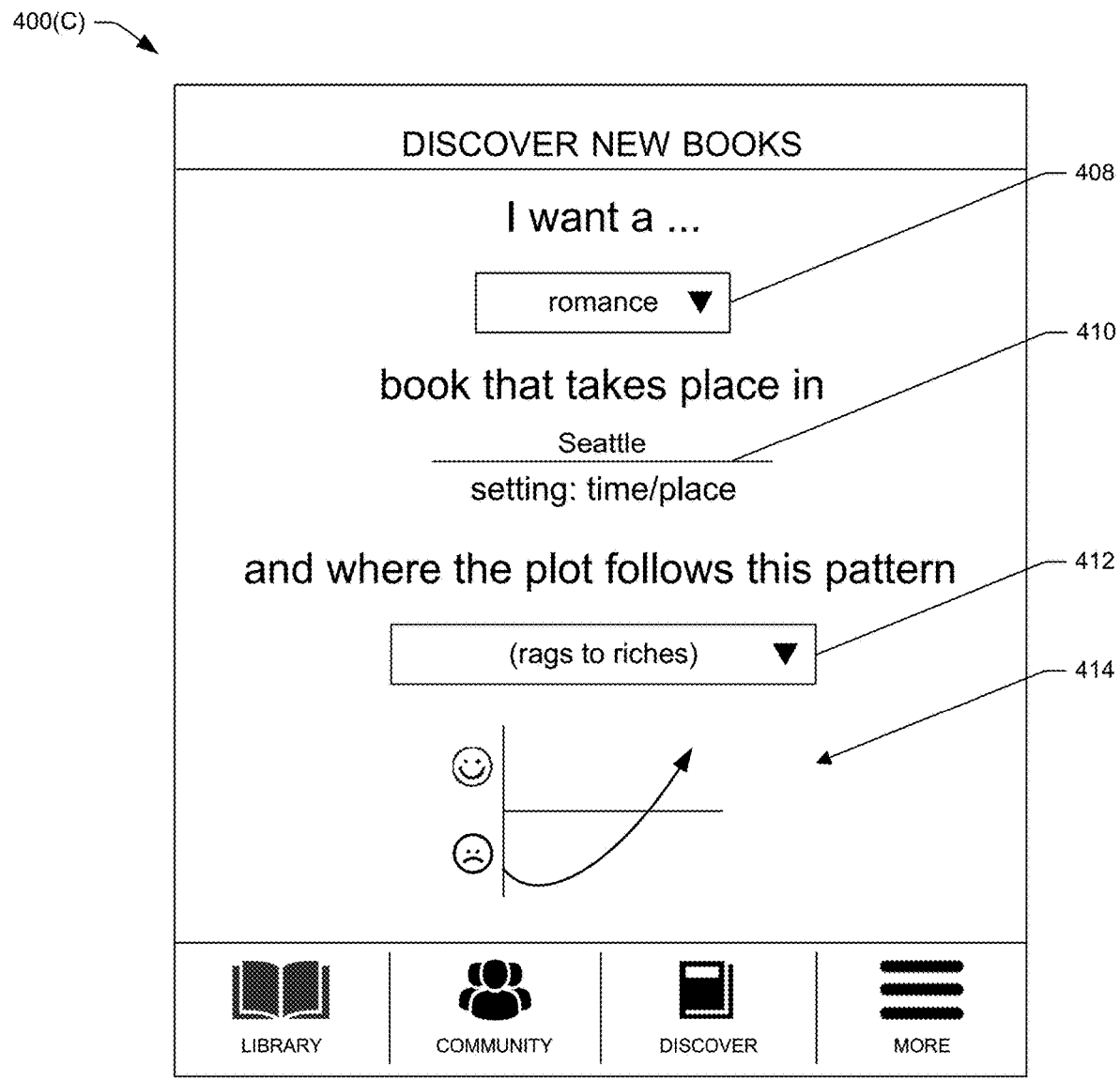
FIG. 4C illustrates a third example of a user interface for displaying literary work recommendations.

FIG. 4C illustrates a user interface 400C that displays a story arc representation 414 upon a selection of a story arc within the drop-down menu 412. Here, for instance, the user has selected "rags to riches" from the drop-down menu 412 and, in response, the story arc representation 414 is displayed within the user interface 400C. The story arc representation 414 may visually indicate the story arc corresponding to the user selection.

Figure 5:
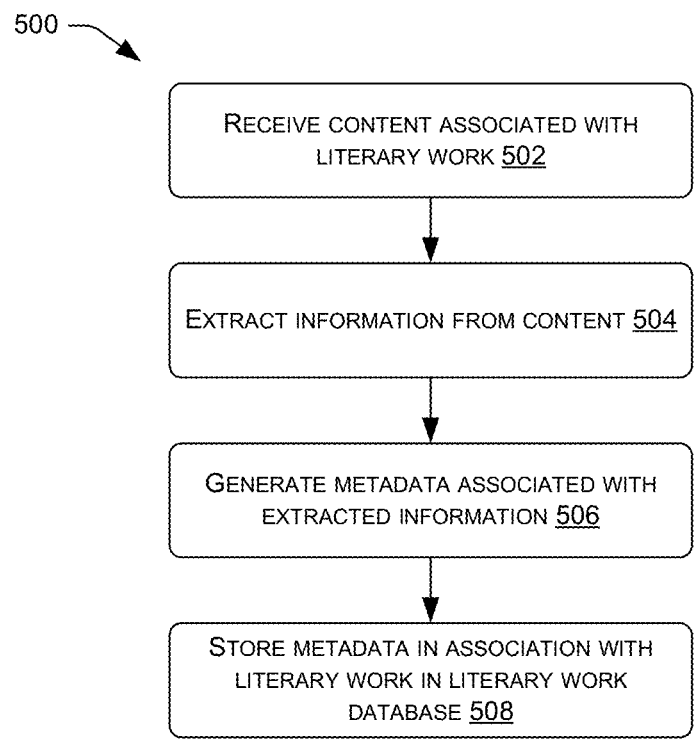
FIG. 5 illustrates a flow diagram of example processes for extracting information from content associated with a literary work.
Figure 6:
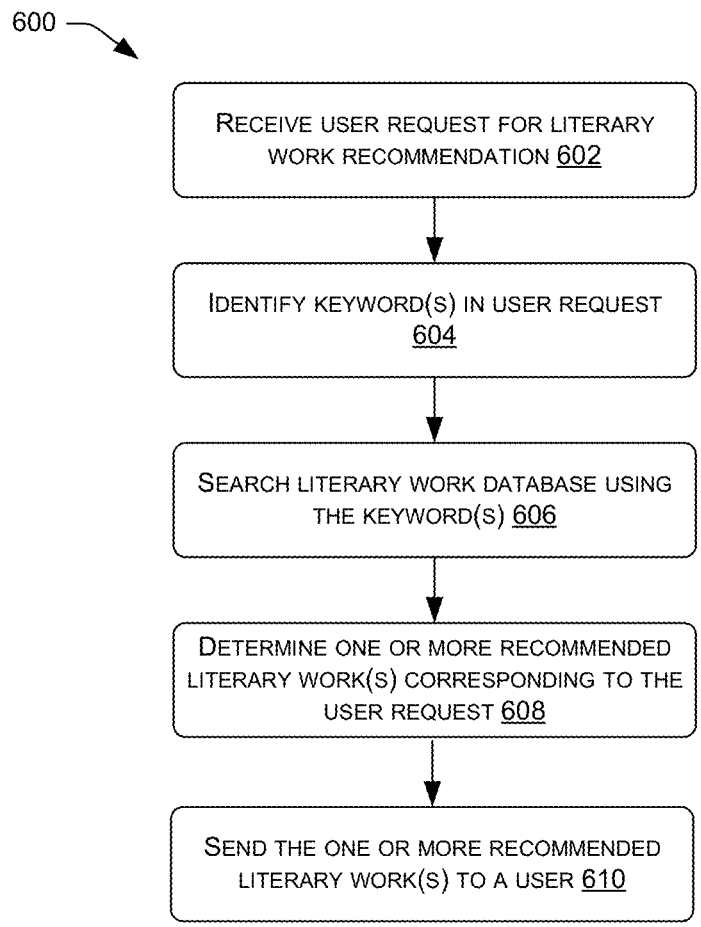
FIG. 6 illustrates a flow diagram of an example process for providing literary work recommendations.
Figure 7:
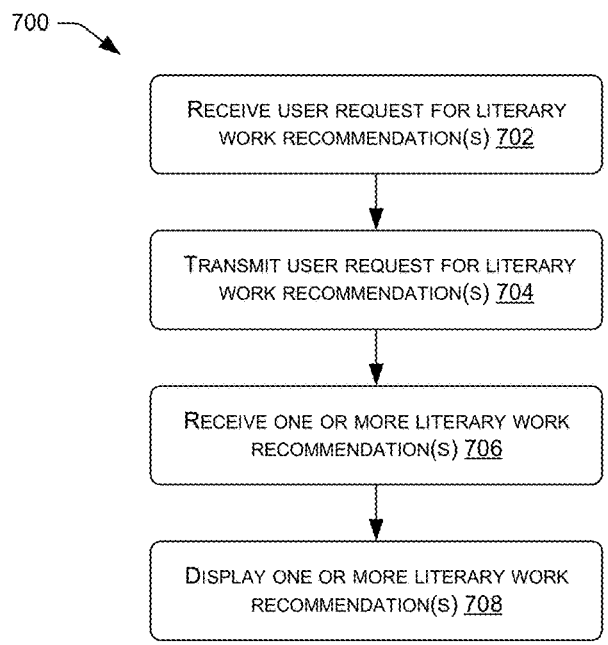
FIG. 7 illustrates a flow diagram of an example process for receiving literary work recommendations.

FIGS. 5-7 illustrate various processes related to providing recommended literary works. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 5-7, although the processes may be implemented in a wide variety of other environments, architectures and systems.

FIG. 5 illustrates a process 500 that may be used to extract information from a literary work. In some instances, the process 500 may be implemented by the recommendation service 108 and/or the one or more servers 112.

At block 502, the process 500 may receive content associated with a literary work. The content may include a review of the literary work, classifications of the literary work, blog posts, and/or text and/or images of the literary work. In some instances, the content may be received from third-party databases, such as the third-party databases 218.

At block 504, the process 500 may extract information from the content of the literary work. For instance, the process 500 may receive a literary work in a particular format and extract the raw text from the literary work. Key attributes or characteristics of the literary work may be extracted, such as the characters, setting(s), events, topics, and so forth. Accordingly, topics, as well as other types of named entities recognized in the literary work, such as characters, people, places, organizations, and so forth, may be identified. Further, one or more weighting or ranking factors may be taken into consideration to identify those topics that may be more relevant to the literary work, such as topics that appear multiple times in the literary work, topics that are linked to other topics in the literary work, and so forth. In some instances, a summary of the literary work may be analyzed using NLP techniques and/or machine-learning algorithms to determine a setting, a plot, a story arc, main characters, and so forth of the literary work. For instance, the NLP techniques may analyze words and a frequency of words included in the literary work. Further, each extracted piece of information may have location information (e.g., metadata) associated therewith that indicates the location within the literary work.

At block 506, the process 500 may generate metadata associated with the extracted information. That is, using the analysis of the literary work (e.g., block 504), the literary work may be characterized by generating metadata that is descriptive of the literary work. The metadata may indicate the plot, the setting(s), and/or the story arc of the literary work, for instance. Moreover, in some instances, an analytics component 120, or another component of the recommendation service 108, may generate a graph descriptive of the story arc. Utilizing the graph, the analytics component 120 may classify, categorize, or determine one or more characteristics of the literary work.

At block 508, the process 500 may store the metadata in association with the literary work in a literary work database. The metadata may be accessible by the recommendation service 108 in order to analyze identifiers of the metadata when determining whether to provide a literary work as a recommended literary work.

FIG. 6 illustrates a process 600 that may be used to provide a literary work recommendation. In some instances, the process 600 may be implemented by the recommendation service 108 and/or the one or more servers 112.

At block 602, the process 600 may receive a user request for a literary work recommendation. For instance, a recommendation service 108 may receive, from a user device 104, a user request for a literary work recommendation. The user request may include criteria corresponding to characteristics of a desired literary work the user would like to read (e.g., plot, setting, etc.).

At block 604, the process 600 may identify keyword(s) within a user request. For instance, a recommendation component 118 or an analytics component 120 of the recommendation service 108 may identify keyword(s) within the user request that correspond to a literary work recommendation. For instance, if a user request includes "Please recommend a high-stakes mystery novel set in the 2000's and involving a bank robbery," the recommendation service 108 may identify keyword(s) such as "high-stakes mystery," "robbery," and "2000's." These keyword(s) describe the user request and the type of literary work corresponding to a recommendation. The identified keyword(s) may be mapped or associated with a genre, a plot, or a story arc of literary work or other keyword(s). Additionally or alternatively, rather than utilizing the literal search criteria (i.e., "high-stakes mystery"), or in addition to, more commonly utilized keyword(s) for metadata lookup and analytic purposes may be used to generalize or categorize the user request.

At block 606, the process 600 may search a literary works database using the keyword(s). For instance, the recommendation component 118 may search the literary works database 122 utilizing the keyword(s) describing the literary work recommendation (e.g., block 604). In some instances, searching the literary works database 122 may involve comparing the keyword(s) to metadata stored in association with individual literary works within the literary works database 122. That is, the keyword(s) associated with the user request are searched in the literary work database 122 and compared with the metadata to determine whether a literary work corresponds to user request (e.g., plot, setting(s), character role, etc.). The process 600 may be configured to determine a similarly, score (e.g., value), or rating between the keyword(s) and the metadata. The comparison may be performed using machine-learning techniques. Additionally, in some instances, rather than searching all literary works in the literary works database 122, the process 600 may identify a first literary work associated with the keyword(s) of the user request, and using the first literary work, may identify additional literary works associated with the first literary work.

At block 608, the process 600 may determine one or more recommended literary work(s) corresponding to the user request. The one or more recommended literary works may satisfy the user request above a certain threshold, may represent a highest-rated literary work, or may include only a predetermined amount of literary works. Further, one or more weighting or ranking factors may be taken into consideration to determine the one or more recommended literary work(s).

At block 610, the process 600 may send the one or more recommended literary work(s) to a user. For instance, a digital version of the one or more recommended literary work(s) may be sent to a user device of a user. For instance, the process 600 may transmit only the highest rated recommended literary work, the top-rated literary work(s), and so forth. The recommendation service 108 may also make the one or more recommended literary work(s) available for delivery to the user device 104, such as being made available for download.

FIG. 7 illustrates a process 700 that may be used to transmit a user request corresponding to a literary work recommendation and receive a literary work recommendation. In some instances, the process 700 may be implemented by a user device, such as the user device 104.

At block 702, the process 700 may receive a user request for a literary work recommendation. For instance, the user device 104 may receive a user request for a literary work recommendation through an input field(s), as discussed hereinabove with regards to FIGS. 4A and 4B.

At block 704, the process 700 may transmit the user request for the literary work recommendation. For instance, the user device 104 may transmit the user request to a recommendation service 108. In some instances, the user device 104 may transmit all input within or associated with the user request, as received at the user device 104, or may identify keyword(s) corresponding to the user request and transmit the identified keyword(s) to the recommendation service 108.

At block 706, the process 700 may receive one or more literary work recommendation(s) from the recommendation service. For instance, an indicator (e.g., text, image, link, etc.) of the one or more literary work recommendation(s) may be received by the user device 104. The one or more literary work recommendation(s) received from the recommendation service 108 may include receiving the one or more literary work recommendation(s) in a ranked order.

At block 708, the process 700 may display the one or more literary work recommendation(s). For instance, the user device 104 may display a rating of the one or more literary work recommendation(s) or a cover of the one or more literary work recommendation(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system for providing book recommendations, the system comprising:
    one or more processors; and
    one or more non-transitory computer-readable media storing computer-executable instructions that, when executed by the one or more processors, cause the one or more processors to perform acts comprising:
        receiving, from a user device of a user, a request for a book recommendation, the request representing a string of text entered by the user via the user device;
        analyzing the request using natural language processing (NLP);
        determining, based on analyzing the request using NLP, one or more keywords that are associated with the book recommendation;
        determining, based on the one or more keywords, a plot, a setting, and a genre of the book recommendation;
        searching a database of digital books based on the plot, the setting, and the genre of the book recommendation to identify one or more digital works related to the plot, the setting, and the genre of the book recommendation, wherein digital books in the database of digital books are stored in association with metadata that indicates the plot, the setting, and the genre of the digital books, and wherein the metadata is generated based at least in part on using NLP to analyze at least one of a review of individual digital books or text of the individual digital books;
        determining, based on searching the database of digital books:
            a first similarity value indicating a first similarity between first metadata stored in association with a first digital book and the one or more keywords; and
            a second similarity value indicating a second similarity between second metadata stored in association with a second digital book and the one or more keywords, wherein the first digital book and the second digital book are responsive to the request;
        determining that the first similarity value is greater than the second similarity value; and
        sending, to the user device, responsive to the request, and based on the first similarity value being greater than the second similarity value, a recommendation of the first digital book.

2. The system of claim 1, wherein the one or more non-transitory computer-readable media further store computer-executable instructions that, when executed by the one or more processors, cause the one or more processors to perform operations comprising:
    receiving a review associated with the first digital book, the review including information related to a plot of the first digital book, a setting of the first digital book, or a genre of the first digital book;
    analyzing the review of the first digital book using NLP;
    determining, based on analyzing the review of the first digital book, one or more of:
        the plot of the first digital book;
        the setting of the first digital book; or
        the genre of the first digital book;
    generating updated first metadata indicating the one or more of:
        the plot of the first digital book;
        the setting of the first digital book; or
        the genre of the first digital book;
    determining that the updated first metadata differs from the first metadata by more than a threshold amount; and
    storing the updated first metadata data in association with the first digital book in the database of digital books based at least in part on determining that the updated first metadata differs from the first metadata by more than a threshold amount.

3. The system of claim 1, wherein the one or more non-transitory computer-readable media further store computer-executable instructions that, when executed by the one or more processors, cause the one or more processors to perform operations comprising:
    receiving a summary of the first digital book;
    analyzing the summary of the first digital book using NLP;
    determining, based on analyzing the summary of the first digital book, one or more of:
        a plot of the first digital book;
        a setting of the first digital book; or
        a genre of the first digital book;
    generating updated first metadata indicating the one or more of:
        the plot of the first digital book;
        the setting of the first digital book; or
        the genre of the first digital book; and
    storing the updated first metadata data in association with the first digital book in the database of digital books.

4. The system of claim 3, wherein the one or more keywords are one or more first keywords, wherein analyzing the summary of the first digital book using NLP comprises analyzing one or more words in the summary, and wherein the one or more non-transitory computer-readable media further store computer-executable instructions that, when executed by the one or more processors, cause the one or more processors to perform an operation comprising:
    determining, based on analyzing the one or more words in the summary:
        one or more second keywords indicating the plot of the first digital book;
        one or more third keywords indicating the setting of the first digital book;
    or
        one or more fourth keywords indicating the genre of the first digital book;
    and
    storing, based on the first metadata, at least one of the one or more second key keywords, the one or more third keywords, or the one or more fourth keywords in association with the first digital book.

5. A method comprising:
    analyzing at least one of a review of a literary work, content of the literary work, or a summary of the literary work;
    determining first metadata associated with the literary work, wherein the first metadata includes one or more first keywords associated with the literary work;

receiving, from a user device associated with a user, a request for a literary work recommendation;

determining one or more second keywords associated with the request, the one or more second keywords associated with the request indicating criteria corresponding to the literary work recommendation;

determining a similarity between the one or more second keywords associated with the request and the one or more first keywords associated with the literary work;

selecting, based at least in part on the similarity, the literary work as a recommended literary work;

generating, based at least in part on selecting the literary work, an identifier indicating the literary work as the recommended literary work; and sending, to the user device and responsive to the request, the identifier.

6. The method of claim 5, wherein the review of the literary work is a first review of the literary work, the method further comprising:

receiving a second review of the literary work, the second review being created by a second user of a second user device;

analyzing the second review of the literary work using NLP;

determining, based at least in part on analyzing the second review of the literary work, one or more third keywords associated with a plot of the literary work;

determining that the one or more third keywords associated with the plot are different than the one or more first keywords associated with the literary work;

generating updated metadata based at least in part on the one or more third keywords associated with the plot, wherein the updated metadata indicates the one or more third keywords associated with the plot and the one or more first keywords associated with the literary work; and storing the updated metadata in association with the literary work in a database of literary works.

7. The method of claim 5, further comprising:

identifying, based at least in part on analyzing the at least one of the review or the summary, at least one of:
an identity of characters referenced in the literary work;
a location of the characters referenced in the literary work;
a first relationship between the characters referenced in the literary work;
or
a second relationship between the characters referenced in the literary work and one or more entities in the literary work, and wherein the one or more first keywords associated with the literary work are further associated with at least one of:
the first relationship between the characters referenced in the literary work; or
the second relationship between the characters referenced in the literary work and the one or more entities in the literary work.

8. The method of claim 7, further comprising:

analyzing, using one or more machine-learning algorithms, at least one of:
the location of the characters referenced in the literary work;
the first relationship between the characters referenced in the literary work; or
the second relationship between the characters referenced in the literary work and the one or more entities in the literary work;

determining, based at least in part on analyzing using the one or more machine-learning algorithms, a story arc of the literary work; and generating, based at least in part on the story arc of the literary work, one or more third keywords describing the story arc of the literary work, and wherein the first metadata further includes the one or more third keywords associated with the story arc of the literary work.

9. The method of claim 5, further comprising determining a story arc category corresponding to the literary work, and wherein:

the one or more first keywords associated with the literary work are further associated with the story arc category of the literary work;

the one or more second keywords associated with the request include a story arc recommendation; and analyzing the at least one of the review of the literary work, the content of the literary work, or the summary of the literary work is further based at least in part on comparing the story arc recommendation with the story arc category stored in association with the literary work.

10. The method of claim 5, further comprising determining that the similarity between the one or more second keywords associated with the request and the one or more first keywords associated with the literary work is greater than a threshold similarity, and wherein selecting the literary work as the recommended literary work is further based at least in part on the similarity being greater than the threshold similarity.

11. The method of claim 5, wherein:

determining the similarity between the one or more second keywords associated with the request and the one or more first keywords associated with the literary work comprises comparing the one or more second keywords associated with the request with the one or more first keywords associated with the literary work; and determining the similarity between the one or more second keywords associated with the request and the one or more first keywords associated with the literary work is further based at least in part on comparing the one or more second keywords associated with the request with the one or more first keywords associated with the literary work.

12. The method of claim 5, wherein:

the literary work is stored in a database of literary works;
the similarity between the between the one or more second keywords associated with the request and the one or more first keywords associated with the literary work is a highest ranked similarity as compared to other similarities between the one or more second keywords associated with the request and one or more keywords of additional literary works.

13. A system comprising:

a database storing a plurality of literary works, wherein individual literary works are stored in association with metadata indicating one or more characteristics of the individual literary works, and wherein the metadata is generated from information extracted from text of the individual literary works;

at least one processor; and one or more non-transitory computer-readable media storing computer-executable instructions that, when executed by the at least one processor, cause the at least one processor to perform operations comprising:
receiving, from a user device associated with a user, a recommendation request;
identifying one or more first keywords included within the recommendation request;
searching the database using the one or more first keywords, wherein the searching comprises comparing the one or more first keywords to one or more second keywords represented by the metadata stored in association with the individual literary works, and wherein the one or more second keywords correspond to the one or more characteristics of the individual literary works;
determining, based at least in part on comparing the one or more first keywords and the one or more second keywords, similarities between one or more of the individual literary works and the recommendation request;
selecting a literary work among the plurality of literary works based at least in part on a similarity between the one or more first keywords and the one or more second keyword;
generating an indication associated with the literary work; and
causing display of the indication on the user device.

14. The system of claim 13, wherein:
the information comprises at least one of an identity of characters in the individual literary works, a relationship between characters in the individual literary works, or a relationship between characters and one or more entities in the individual literary works; and
the metadata indicates the at least one of the identity of characters in the individual literary works, the relationship between characters in the individual literary works, or the relationship between characters and one or more entities in the individual literary works.

15. The system of claim 13, wherein the one or more non-transitory computer-readable media further store computer-executable instructions that, when executed by the at least one processor, cause the at least one processor to perform operations comprising:
analyzing the information using a machine-learning algorithm; and
determining, based at least in part on analyzing the information using the machine-learning algorithm, one or more of a plot of the individual literary works, a setting of the individual literary works, or a story arc of the individual literary works.

16. The system of claim 15, wherein the one or more non-transitory computer-readable media further store computer-executable instructions that, when executed by the at least one processor, cause the at least one processor to perform operations comprising determining a story arc category corresponding to the recommendation request and wherein the one or more second keywords further correspond to the story arc category.

17. The system of claim 15, wherein the one or more non-transitory computer-readable media further store computer-executable instructions that, when executed by the at least one processor, cause the at least one processor to perform operations comprising determining, based at least in part on analyzing the information using the machine-learning algorithm:
a relationship between one or more characters in the literary work; and
one or more patterns corresponding to the relationship between the one or more characters in the literary work, wherein the story arc of the literary work is based at least in part on the one or more patterns corresponding to the relationship between the one or more characters.

18. The system of claim 13, wherein the recommendation request is received from the user device, and wherein the one or more non-transitory computer-readable media further store computer-executable instructions that, when executed by the at least one processor, cause the at least one processor to perform operations comprising:
determining, based at least in part on analyzing the database using the first keywords, a ranking of one or more of the plurality of literary works in relation to one another; and
transmitting the ranking of the one or more literary works to the user device.

19. The system of claim 13, wherein the recommendation request is received from the user device, wherein the literary work corresponds to an electronic book, and wherein the one or more non-transitory computer-readable media further store computer-executable instructions that, when executed by the at least one processor, cause the at least one processor to perform an operation comprising transmitting data associated with the electronic book to the user device.

20. The method of claim 5, further comprising receiving, from the user device, a second request for the recommended literary work.

* * * * *